United States Patent [19]
Bede

[11] 3,944,169
[45] Mar. 16, 1976

[54] HANG GLIDER

[75] Inventor: James R. Bede, Cleveland, Ohio

[73] Assignee: James R. Bede, Newton, Kans.

[22] Filed: July 12, 1974

[21] Appl. No.: 487,862

[52] U.S. Cl. ............... 244/16; 244/138 R; 244/142
[51] Int. Cl.² ......................................... B64C 31/02
[58] Field of Search ........ 244/142, 145, 146, 138 R, 244/16, 5, 32, DIG. 1, 97, 128, 152, 31, 33, 96

[56] References Cited
UNITED STATES PATENTS

| | | | |
|---|---|---|---|
| 1,376,121 | 4/1921 | Smyth | 244/33 |
| 2,451,815 | 10/1948 | Donnell et al. | 244/96 |
| 3,412,963 | 11/1968 | Struble | 244/146 |
| 3,521,836 | 7/1970 | Struble | 244/138 R X |
| 3,524,613 | 8/1970 | Reuter et al. | 244/142 |
| 3,558,087 | 1/1971 | Barish | 244/142 |
| 3,749,337 | 7/1973 | Jalbert | 244/145 |

Primary Examiner—Trygve M. Blix
Assistant Examiner—Barry L. Kelmachter
Attorney, Agent, or Firm—Meyer, Tilberry & Body

[57] ABSTRACT

A hang glider in the form of an aerial wing of airfoil shape is disclosed. The wing is defined by an outer envelope of flexible material inflatable to the airfoil shape and having a plurality of chambers therein each receiving an inflatable bladder. Air inlet openings are provided in the bottom portion of the envelope adjacent the leading edge of the wing. Either the bladders or the chambers are inflated with a gas lighter than air and, during flight, air enters the openings and fills the available space in the others of the bladders or chambers to provide a complete smooth airfoil shape for the wing. Shroud lines are employed to suspend a person beneath the wing during flight.

19 Claims, 7 Drawing Figures

FIG. I.

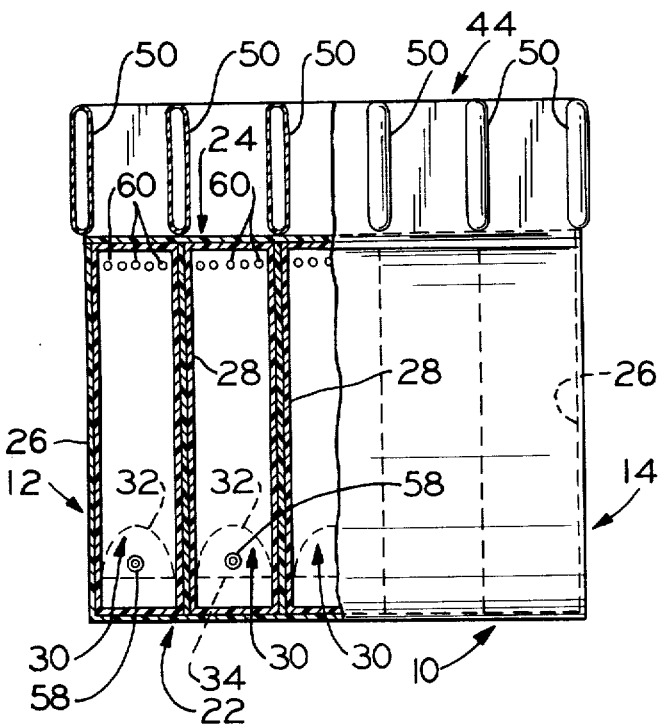
FIG. 2.
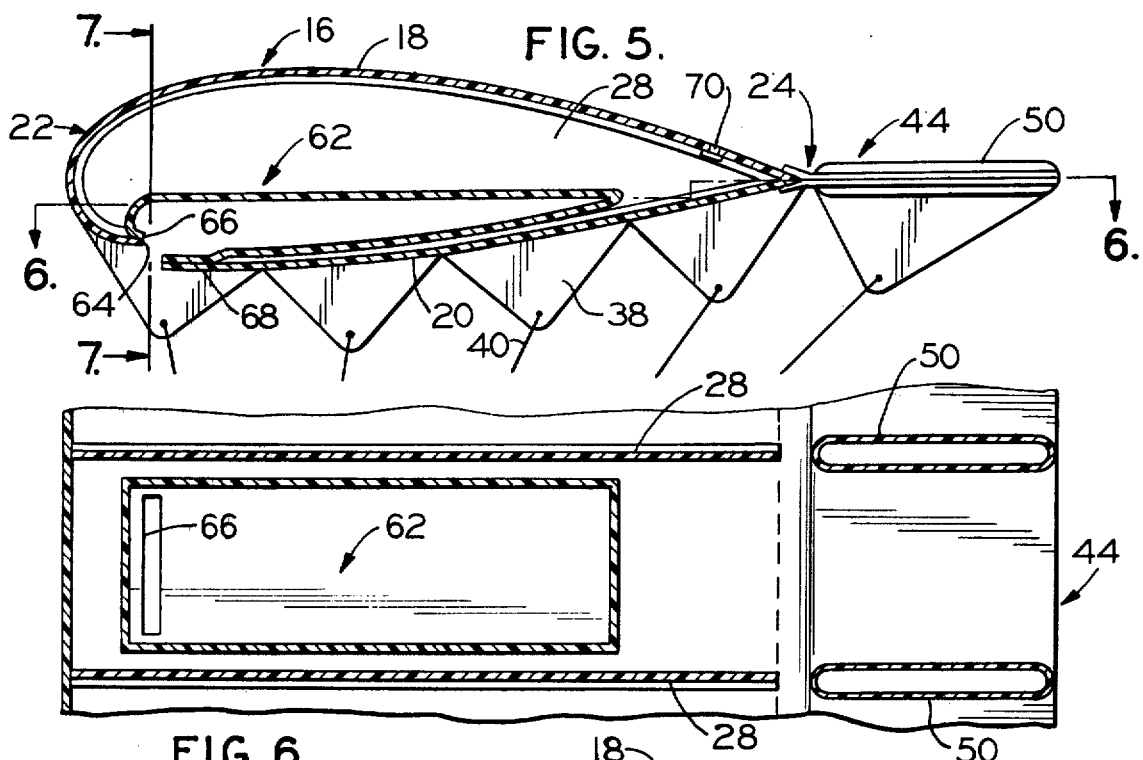
FIG. 5.
FIG. 6.
FIG. 7.

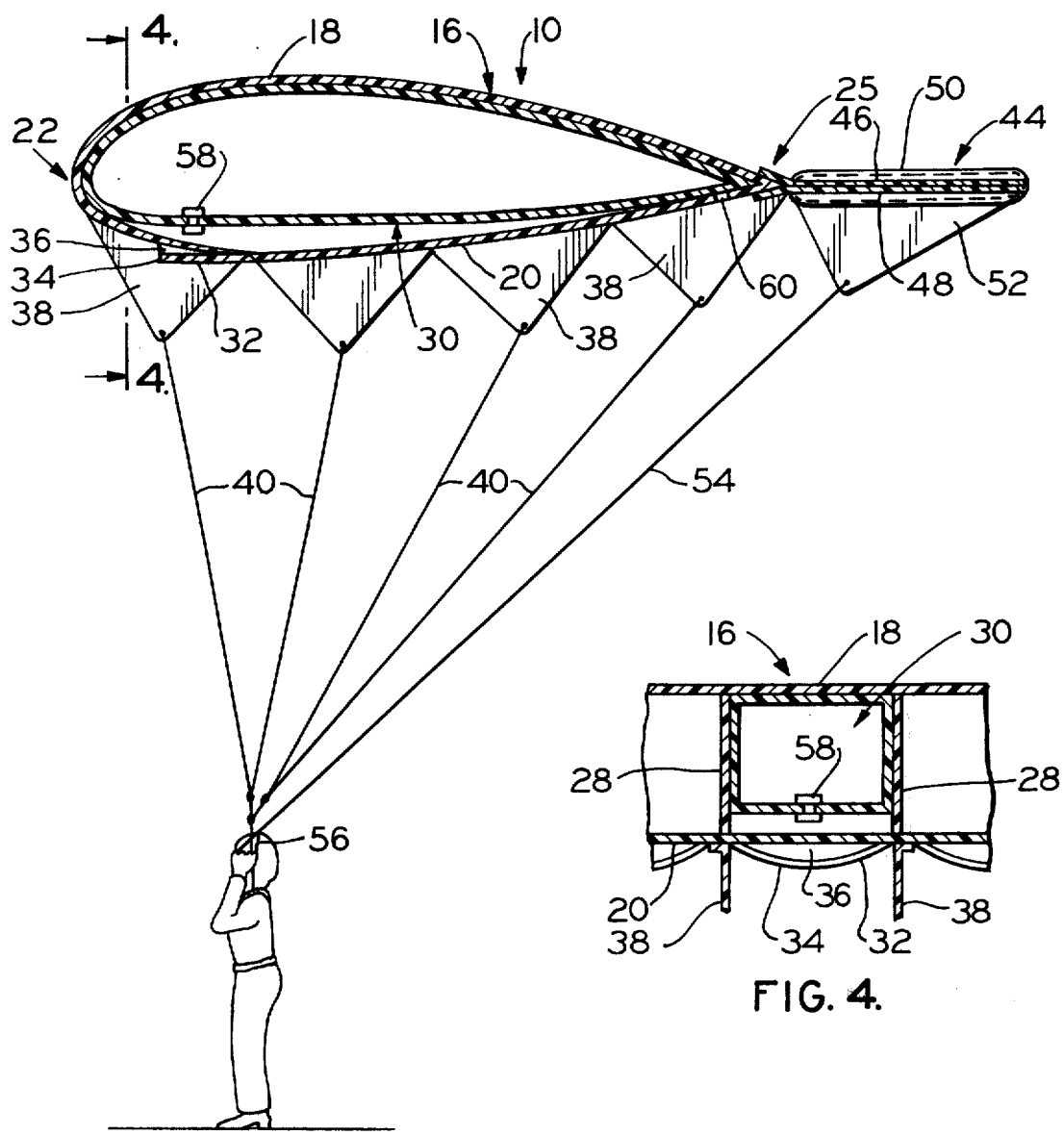

HANG GLIDER

This invention relates to the art of aerial devices and, more particularly, to an aerial wing of airfoil shape for suspending loads in flight through the atmosphere.

The aerial wing of the present invention finds particular utility as a hang glider which is flown by an individual essentially hanging in suspension from the wing structure. The term hang gliders is used currently in connection with a sport-type aerial vehicle capable of supporting an individual for gliding-type flight through the atmosphere. These devices are essentially one man gliders of a size and weight which enables the operator to, for example, run down a hill into a breeze holding the glider over his head so that the glider device becomes airborne and supports the operator in flight for a reasonable length of time. The forward speed of the glider is generally slow enough that landing is accomplished by the operator touching the ground with his feet in a running motion. During flight, directional control, climb and descent are generally controlled by the operator shifting his weight relative to the glider structure.

A wide variety of such hang gliders, or aerial devices having a similar function, have been provided heretofore. Among such previous devices are those comprised of an airframe of rigid structure supporting cloth or other sheet material defining wing panels. Generally, the structure is sufficiently light to enable a person to manipulate the glider while on the ground, and the components of the structure are often collapsible to facilitate storage of the glider when not in use. Hang gliders of this character have many drawbacks including, for example, the fact that the airframe structure can cause injury to the operator if the landing speed is too great and/or the operator cannot stand upright when his feet touch the ground on landing. Further, such airframe structures are subject to breakage in flight, whereby a serious or fatal crash could result. Moreover, the combined weight of the glider and its occupant must be lifted for flight. This generally restricts gliding to a downward path from a first elevation to a second lower elevation and requires a considerable wind to maintain flight. Thus, use of the device is restricted to terrain areas and/or days when there is sufficient wind speed. Still a further drawback with regard to such rigid airframe type hang gliders lies in the inability to sufficiently control flight of the device to avoid ascent to a dangerous altitude or wing stalls resulting in a very rapid descent.

Other hang gliders and similar devices heretofore provided have included open, airfoil shaped wing structures adapted to be inflated to the airfoil shape by air passing through the wing structure during flight. These devices, while affording a better degree of control of flight than the rigid airframe type gliders, have no stability against collapse during flight other than that provided by wind blowing through the cells of the wing structure. Accordingly, the device has to be carefully directed relative to wind direction to avoid collapse and sudden descent. Moreover, since wind is relied upon for establishing and maintaining the airfoil shape, use of the device as a hang glider is limited in accordance with wind conditions. Moreover, the structural instability of the device, if used as an operator controlled hang glider, would render the device unsafe for use by an inexperienced or untrained operator.

Other operator controlled gliding devices heretofore provided have included aerial wing structures having an airfoil shape in cross section and including an envelope of flexible material inflated with a gas lighter than air to achieve buoyancy. WHile such a structure reduces the likelihood of collapse of the glider and/or sudden descent such as that attendant to rigid airframe and air inflated wings of the type mentioned hereinabove, the structures of such devices heretofore provided are somewhat complex with regard to controlling the wing shape in response to changes in the pressure of the inflating gas. Moreover, such devices rely solely on the inflating gas to achieve an airfoil shape. Thus, in the event of a rupture in the wing during use, a sizeable portion of the total wing structure collapses and the airfoil shape in the collapsed portion is lost. The end result is not only a loss in buoyancy but also a substantial reduction in the ability to control descent of the device and a safe return to earth.

In accordance with the present invention, an aerial wing is provided which overcomes the disadvantages of similar devices heretofore provided, including those disadvantages specifically pointed out hereinabove. More particularly, the aerial wing of the present invention is an inflatable structure having an airfoil shape and constructed of flexible sheet material, thus to minimize the possibility of injury to the operator by contact with the device. Further, the structure enables achieving a desired buoyancy for the wing and at the same time maintaining the desired airfoil shape during flight regardless of the extent to which the structure is inflated to its full capacity with gas. Still further, the wing structure enables the airfoil shape to be maintained even in the event of a loss in buoyancy due to a rupture in the wing and a loss of at least a portion of the inflating gas during flight. Accordingly, the aerial wing of the present invention can be safely used by inexperienced and untrained operators. Moreover, the wing structure maximizes stability and control thereof during flight thus increasing the ability to safely operate the wing glider at relatively high altitudes. In this respect, the operator is suspended a considerable distance below the wing to increase stability, and the buoyancy minimizes any possibility of the operator getting the wing into an uncontrolled attitude. For example, should the wing be flown at too high an angle of attack so as to produce a stall, the loss of lift would be minimal and any descent under such conditions would likewise be minimal.

The foregoing advantages are achieved in accordance with the present invention by providing a wing structure which includes an envelope inflatable to an airfoil shape. Inflation of the envelope is achieved at least in part by a quantity of inflating gas which is retained in the wing, and by introduction of outside air into the wing during flight. The inflating gas is retained in the wing in sealed relationship with respect to the incoming air during flight and provides the desired buoyancy for the wing. The incoming air occupies space within the wing, the volume of which is determined by the amount of inflating gas in the wing, and the inflating gas and air cooperate to maintain the desired airfoil shape of the wing during flight. Upon expansion of the inflating gas during flight, the air space is of course reduced, but the inflating gas and air continue to maintain the desired airfoil shape. Moreover, upon contraction of the inflating gas the air space increases and is filled with incoming air so that the inflating gas and air continue to maintain the desired airfoil shape.

As mentioned hereinabove, the operator is suspended below the wing, and such suspension may be achieved by shroud lines attached to the wing and to a harness or the like worn by the operator. Moreover, the operator can exercise certain control of the flight by manipulating such shroud lines and, if desired, control elements such as an elevator on the trailing edge of the wing can be provided to further increase the operator's ability to control the flight.

It is accordingly an outstanding object of the present invention to provide an improved inflatable aerial wing device for suspending a load for flight through the atmosphere.

Another object is the provision of a device of the foregoing character which enables maintaining a desired airfoil shape at various altitudes of flight and in response to expansion and contraction of an inflating gas therein.

Yet another object is the provision of a device of the foregoing character for supporting a human being for flight through the atmosphere and which maximizes conditions of safety with respect to the operator during flight and landing of the device.

Still another object is the provision of a device of the foregoing character which utilizes both an inflating gas and the flow of outside air into the device to maintain a desired airfoil shape and thus increase stability of the device in flight and the ability to control flight of the device.

Still a further object is the provision of an inflatable aerial wing for suspending a human being in flight and which is of a light weight structure, relatively simple to manufacture, and fabricated primarily of flexible sheet material to minimize the possibility of injury to the operator thereof.

The foregoing objects, and others, will in part be obvious and in part pointed out more fully hereinafter in conjunction with the written description of preferred embodiments of the invention illustrated in the accompanying drawings in which:

FIG. 2 is a plan view, partially in section, of the aerial wing, the view being along line 2—2 in FIG. 1;

FIG. 3 is an elevation view of the wing, partially in section, the view being along line 3—3 in FIG. 1;

FIG. 4 is a detailed sectional view of the wing taken along line 4—4 in FIG. 3;

FIG. 5 is a cross-sectional elevation view of another embodiment of the aerial wing of the present invention;

FIG. 6 is a plan view in section of the embodiment shown in FIG. 5, the section being along line 6—6 in FIG. 5; and, FIG. 7 is a sectional elevation view of the embodiment shown in FIG. 5, the section being along line 7—7 in FIG. 5.

Figure 1:
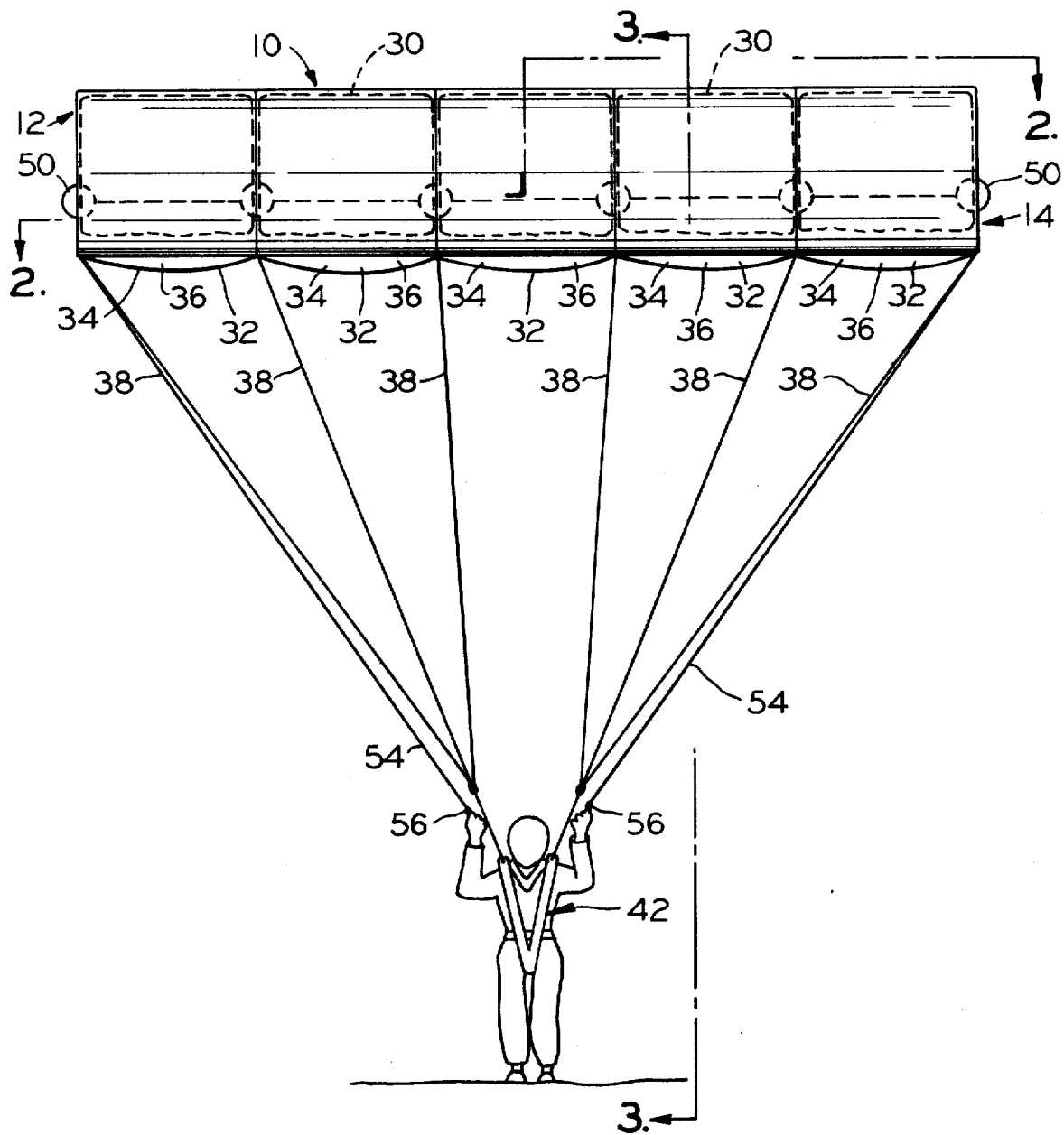
FIG. 1 is a front elevation view of an aerial wing made in accordance with the present invention.

Referring now in greater detail to the drawings wherein the showings are for the purpose of illustrating preferred embodiments of the invention only and not for the purpose of limiting the invention, a hang glider is shown in FIGS. 1–4 which includes an aerial wing 10 having longitudinally opposite ends 12 and 14 and which, in plan view, is rectangular in shape. Wing 10 includes an outer envelope 16 of flexible material such as a rubberized fabric, plastic, or the like, and which envelope is inflatable to an airfoil shape as shown in FIG. 3. Envelope 16 includes a top portion 18 and a bottom portion 20, which portions meet to provide the wing with the leading edge 22 and a trailing edge 24. Envelope 16 further includes end wall panels 26 at the opposite ends thereof and which end wall panels have the desired airfoil shape. Envelope 16 may be constructed in any suitable manner and, in the embodiment shown, top and bottom portions 18 and 20 are defined by a continuous sheet of material having its opposite ends bonded or otherwise suitably interconnected along trailing edge 24, and end walls 26 are separate panels of similar material bonded or otherwise secured to the material of the top and bottom portions of the envelope.

A plurality of partitions 28 having the desired airfoil shape are disposed within envelope 16 in spaced apart relationship along the length of the wing. Partitions 28 are of a flexible sheet material preferably corresponding to that of envelope 16 and are bonded or otherwise secured to the envelope so as to extend generally perpendicular to top and bottom portions 18 and 20 and to leading and trailing edges 22 and 24. Partitions 28 divide the interior of envelope 16 into a plurality of chambers disposed side-by-side between ends 12 and 14 of the wing. While five such chambers are shown in the preferred embodiment, it will be appreciated that a greater or lesser number of chambers can be employed.

An inflatable bladder 30 of flexible sheet material such as that employed for envelope 16 is disposed in each of the chambers. Bladders 30 are shown in a partially inflated condition and, when fully inflated, generally conform with the contour of the corresponding chamber as defined by the top and bottom portions of envelope 16 and the sidewalls of the chamber which of course are defined by adjacent partitions 28 or by an end wall 26 and the adjacent partition. Bladders 30 may be of any suitable structure and may, for example, be of a unitary wall structure in the form of a balloon, or comprised of a plurality of sheet material panels suitably interconnected with one another.

The material of bottom portion 20 of envelope 16 is structured to provide a plurality of air scoops 32 each leading into a corresponding one of the chambers in the envelope. In the embodiment shown, air scoops 32 are defined by slitting the material of bottom portion 20 along lines extending generally parallel to leading edge 22, and suitably shaping a portion of the material behind the cut line downwardly to provide an arcuate leading edge 34 for the air scoop, as shown in FIG. 4. It will be appreciated, however, that a section of the material of bottom portion 20 could be removed to define an opening therethrough and a panel bonded or otherwise secured along the side and rear edges of such an opening to achieve the same air scoop structure. Each air scoop 32 provides an opening 36 facing leading edge 22 and defining an entrance into the air scoop and thus the corresponding chamber. Each opening 36, preferably, is generally coextensive in width with the width of the corresponding chamber and is disposed reasonably close to leading edge 22 of the wing.

Bottom portion 20 of envelope 16 is provided with a plurality of rows of webs 38 of suitable flexible sheet material, such as that employed for envelope 16. The rows of webs 38 underlie end walls 26 of the envelope and each of the partitions 28, and each row is comprised of a plurality of webs 38 extending between leading edge 22 and trailing edge 24 of the wing. Preferably the webs are triangular in shape, and shroud lines 40 are attached to the webs and to a suitable harness or the like 42 which supports a person relative to the wing during flight thereof.

If desired, an elevator 44 can be provided as an integral part of or as an attachment to the trailing edges of the wing to facilitate changing the amount of lift that the wing can produce at a given speed of flight. In the embodiment shown, elevator 44 is in the form of a flap attached to the trailing edge of the wing and defined by a pair of panels 46 and 48 of flexible sheet material such as that employed in constructing envelope 16. Panels 46 and 48 are provided intermediate their opposite ends with a plurality of opposed recesses which together define hollow bulbous ribs 50 extending generally perpendicular to trailing edge 24 of the wing. Panels 46 and 48 are bonded or otherwise suitably interconnected between ribs 50, and the latter are adapted to be inflated to add rigidity to the elevator component. The front edges of panels 46 and 48 receive the trailing edge of the wing therebetween and are bonded or otherwise secured to the corresponding top and bottom portions of envelope 16. Webs 52 of flexible sheet material are attached to the endmost ribs 50, and control lines 54 are connected to webs 52 and to corresponding handles or the like 56 which are grasped and manipulated by the person suspended beneath the wing. While a separate elevator component is shown, it will be appreciated that the elevator component could be defined by integral extensions of the material of envelope 16.

With regard now to the operation of the embodiment illustrated in FIGS. 1-4, each of the bladders 30 is inflated to a predetermined extent of the capacity thereof with a gas lighter than air, such as hydrogen or helium for example. Inflation can be achieved in any desired manner and, for example, each bladder can be provided with an inflation valve 58 accessible through opening 36 of air scoop 32. Inflation of bladders 30 provides for inflation of the corresponding chamber 16 to substantially the desired airfoil shape. The extent to which the bladders are inflated will depend on the degree of buoyancy desired under the prevailing weather conditions and the weight of the person using the wing. For purposes of example, it will be assumed that the bladders are each inflated to about 75 percent of their maximum capacity. Accordingly, the bladders do not completely occupy the space in the corresponding chambers in envelope 16, and bottom portion 20 of the envelope sags or hangs loosely beneath the bottom portion of the corresponding bladder. As the wing moves forwardly through the atmosphere to achieve flight, and during such flight, air is rammed into each of the chambers through openings 36 of air scoops 32. The pressure of this ram air further inflates the corresponding chamber to shape the bottom portion of the envelope and thus provide the wing with an overall smooth airfoil shape. If desired, each chamber can be provided adjacent trailing edge 24 of the wing with a plurality of exhaust openings 60 for the restricted discharge of input or ram air to the chambers.

As the wing ascends the gas in bladders 30 expands and, accordingly, the maximum altitude to which the wing can ascend is dependent on the initial extent of inflation thereof with respsct to their maximum capacity. As the wing ascends and the gas in bladders 30 expands, the air in the chamber is expelled through opening 36, and as the wing descends and the gas contracts additional air enters the chamber through openings 36. Accordingly, during flight the desired smooth airfoil shape is constantly maintained. As a safety device, it may be desirable to provide pressure relief valves, not shown, for the bladders 30 in the event that the wing ascends to an altitude beyond that at which the bladders reach their full inflation size.

While a gas lighter than air will most often be used to inflate bladders 30 so as to provide buoyancy and thus enable flight of the wing under conditions of little or no wind, it will be appreciated that under certain conditions the wing could be flown with air as the inflating gas for bladders 30. In this respect, while no buoyancy would be achieved, the air would inflate the wing to the partial airfoil shape as described above and ram air would further inflate the wing as described. This enables use of the wing under conditions of high wind speed which would otherwise overpower the wing or make control thereof difficult as a result of the buoyancy provided by lighter than air gas.

FIGS. 5-7 illustrate a modification of the chamber and bladder arrangement for the wing described hereinabove. Accordingly, like numerals are employed in FIGS. 5-7 to designate components corresponding to the wing structure illustrated in FIGS. 1-4. In the embodiment shown in FIGS. 5-7, envelope 16 is divided internally into a plurality of chambers in the manner described hereinabove, and each of the chambers houses an inflatable bladder 62 which is considerably smaller than the capacity of the chamber. Bladder 62 is constructed of flexible material such as that of bladders 30 described herein. Bottom portion 20 of the envelope material is provided with an opening 64 therein adjacent leading edge 22 of the wing, and bladder 62 is provided with an opening 66 corresponding in contour to opening 64. The bladder and bottom portion 20 of the envelope are bonded or otherwise suitably interconnected about the periphery of openings 64 and 66 to seal the interior of the chamber with respect to the interior of bladder 62. Moreover, the material of bladder 62 and bottom portion 20 of the envelope adjacent the trailing edge of the openings therethrough is formed to define air scoops 68 leading into the interior of the bladder.

In the embodiment of FIGS. 5-7, the wing chambers are inflated with a gas lighter than air and, for this purpose, envelope 16 can be provided with inflation valves such as valve 70, for example. Each chamber would of course be provided with such an inflation valve. Each chamber is inflated to a predetermined extent of its capacity, and each bladder 62 is thus capable of receiving the quantity of air required to expand the corresponding chamber to the complete airfoil shape. Thus, during flight, ram air enters bladder 62 and expands the latter in accordance with the available space so that the desired airfoil shape of the wing is maintained during flight. As the wing ascends and the gas in the chamber expands, the air in bladder 62 is expelled through openings 64 and 66, and as the wing descends and the gas contracts additional air fills the bladders. Accordingly, the desired smooth airfoil shape is maintained throughout flight of the wing.

It will be appreciated from the foregoing description that the chambers in the embodiment of FIGS. 5-7 are sealed so as to receive and hold the inflating gas and that the bladders are likewise sealed to receive and hold incoming air to prevent gas flow communication between the bladders and their corresponding chambers. In the embodiment of FIGS. 1-4, however, it will be appreciated that it is only necessary to provide for bladders 30 to be sealed so as to receive and hold inflating gas and prevent gas flow communication between the bladders and their corresponding chambers. Since the chambers in the embodiment of FIGS. 1–4 only receive ram air, the material of envelope 16, end walls 26 and partitions 28 does not have to be completely sealed so as to be gas tight. The latter is preferred, however, so that escape of inflating gas from the chambers through the envelope material would be avoided in the event of a rupture in the corresponding bladder.

The preferred arrangement of a plurality of chambers and corresponding bladders in the embodiments herein described advantageously prevents complete collapse of the wing in the event of a rupture in one of the inflating gas receiving chambers or bladders. Thus, in the event of such a rupture minimum buoyancy is lost and the operator is protected against a too rapid descent. Further, as inflating gas escapes from a ruptured chamber or bladder, the amount of ram air entering the wing increases. In the embodiment of FIGS. 1–4, such ram air would fill the chamber and substantially maintain the airfoil shape of the corresponding portion of the wing. Likewise, in the embodiment of FIGS. 5–7 such ram air would fill the bladder to the full capacity thereof. In the latter embodiment, the capacity of the bladder relative to the corresponding chamber would determine the extent to which the full airfoil shape of the ruptured chamber could be maintained. In any event, it will be appreciated that with the preferred embodiments described herein, loss of airfoil shape and loss of control of the flight of the wing by the operator is minimized in the event of a rupture and loss of inflation gas.

As an example of the size of the aerial wing of the present invention, the wing preferably has a length between ends 12 and 14 of about 20 feet and a width between leading and trailing edges 22 and 24 of about 15 feet. Further, when inflated to the desired airfoil shape, the wing has a maximum dimension between top and bottom portions 18 and 20 of the envelope of about four feet, and the elevator extends the full length of the trailing edge of the wing and has a width perpendicular to the trailing edge of about five feet. Moreover, the operator is suspended from about 15 feet to 20 feet below the wing to maximize stability.

While a plurality of chambers and corresponding bladders is preferred for the foregoing reasons, it will be appreciated that the desired airfoil shape can be obtained and maintained by the combination of a single chamber and a single bladder in either of the embodiments herein described. In such a single chamber-single bladder construction one or more air scoop openings for ram air could be provided along the length of the wing. Moreover, while considerable emphasis has been placed on the structure of and the structural interrelationship between the chamber and bladder components of the embodiments disclosed, it will be appreciated that many changes can be made therein without departing from the principles of the present invention.

As many embodiments of the invention may be made and as many changes may be made in the embodiments herein illustrated and described, it is to be distinctly understood that the foregoing descriptive matter is to be interpreted merely as illustrative of the present invention and not as a limitation.

What is claimed is:

1. An aerial wing for soaring having opposite ends and a generally uniform airfoil shape between said ends comprising, an envelope of flexible sheet material inflatable to said airfoil shape and having leading and trailing edges, the interior of said envelope defining chamber means, inflatable bladder means within said chamber means and including wall means separate from said envelope and providing an airfoil shape for said bladder means generally corresponding in contour to said airfoil shape of said envelope, said bladder means being expandable and contractible within and relative to said chamber means and being sealed against fluid flow communication therewith, one of said chamber means and bladder means being adapted to receive and hold a quantity of gas, means defining air passageway means opening into the other of said chamber means and bladder means and having entrance means through said envelope adjacent said leading edge, and means to suspend a load beneath said wing.

2. The aerial wing according to claim 1, wherein said envelope has a bottom portion between said leading and trailing edges, said entrance means being through said bottom portion.

3. The aerial wing according to claim 1, wherein said envelope has a bottom portion between said leading and trailing edges, and said means to suspend a load includes means on said bottom portion for attaching shroud lines to said wing.

4. The aerial wing according to claim 1, and elevator means along said trailing edge and pivotal relative to said envelope.

5. The aerial wing according to claim 1, wherein said bladder means is said one of said chamber means and bladder means.

6. The aerial wing according to claim 1, wherein said chamber means is said one of said chamber means and bladder means.

7. The aerial wing according to claim 1, wherein said chamber means includes a plurality of chambers disposed side-by-side in said envelope, said chambers including sidewall means extending in the direction between said leading and trailing edges, and said bladder means includes an inflatable bladder in each chamber.

8. The aerial wing according to claim 7, wherein said sidewall means seal adjacent ones of said chambers against fluid flow communication therebetween and said bladder means is said other of said chamber means and bladder means, each said inflatable bladder having an opening thereinto, said envelope having a bottom portion between said leading and trailing edges, said entrance means through said envelope including openings through said bottom portion each communicating with a corresponding bladder opening.

9. The aerial wing according to claim 7, wherein said envelope includes a bottom portion between said leading and trailing edges and said chamber means is said other of said chamber means and bladder means, said entrance means through said envelope including an opening through said bottom portion into each of said chambers.

10. An aerial wing for soaring having opposite ends and a generally uniform airfoil shape between said ends comprising, an envelope of flexible sheet material, said envelope having end walls and top and bottom portions meeting to define generally parallel leading and trailing edges of said wing, a plurality of partitions of flexible sheet material in said envelope and attached thereto, said end walls and partitions having said airfoil shape and extending generally perpendicular to said top and bottom portions and to said leading and trailing edges, said end walls and partitions dividing the interior of said envelope into a plurality of chambers, an inflatable bladder in each chamber, each bladder including wall means separate from said envelope and providing said bladders with a contour generally corresponding to the contour of the corresponding chamber, each bladder being expandable and contractible within and relative to the corresponding chamber, each chamber and corresponding bladder being sealed against fluid flow communication therebetween, one of said chamber and corresponding bladder being adapted to receive and hold a quantity of gas, means defining an air passageway opening into the other of said chamber and corresponding bladder and having an entrance through said bottom portion of said envelope adjacent said leading edge, and means for attaching load supporting shroud lines to said bottom portion of said envelope.

11. The aerial wing according to claim 10, wherein said air passageway opens into said chamber and said entrance is defined by an opening through said bottom portion facing in the direction of said leading edge and extending generally parallel thereto.

12. The aerial wing according to claim 11, further including elevator means extending along said trailing edge and pivotal relative to said envelope, and means for attaching control line means to said elevator means.

13. The aerial wing according to claim 11, and air outlet means for said chamber, said outlet means opening through said envelope adjacent said trailing edge.

14. The aerial wing according to claim 11, wherein said means for attaching shroud lines includes a plurality of rows of individual webs of flexible sheet material attached to said bottom portion, said rows extending between said leading and trailing edges, and the webs in each row being generally coplanar.

15. The aerial wing according to claim 14, wherein said rows each underlie one of said end walls and partitions.

16. The aerial wing according to claim 10, wherein said air passageway opens into said bladder and said entrance is defined by an opening through said bottom portion facing in the direction of said leading edge and extending generally parallel thereto, said means defining said air passageway including an opening in said bladder and means connecting said bladder and bottom portion of said envelope for said openings to be in flow communication.

17. The aerial wing according to claim 16, and elevator means extending along said trailing edge and pivotal relative to said envelope, and means for attaching control line means to said elevator means.

18. The aerial wing according to claim 16, wherein said means for attaching shroud lines includes a plurality of rows of individual webs of flexible sheet material attached to said bottom portion, said rows extending between said leading and trailing edges, and the webs in each row being generally coplanar.

19. The aerial wing according to claim 16, wherein said rows each underlie one of said end walls and partitions.

* * * * *